(12) United States Patent
Diep et al.

(10) Patent No.: US 9,109,617 B2
(45) Date of Patent: Aug. 18, 2015

(54) SELF-CLOSING POSITIVE ENGAGEMENT CLIP

(71) Applicant: Newfrey LLC, Newark, DE (US)

(72) Inventors: Tien T. Diep, West Bloomfield, MI (US); Terri L. Wernert, China, MI (US)

(73) Assignee: NEWFREY LLC, Newark, DE (US)

( * ) Notice: Subject to any disclaimer, the term of this patent is extended or adjusted under 35 U.S.C. 154(b) by 184 days.

(21) Appl. No.: 13/711,994

(22) Filed: Dec. 12, 2012

(65) Prior Publication Data

US 2014/0157557 A1 Jun. 12, 2014

(51) Int. Cl.
| | |
|---|---|
| *F16L 3/10* | (2006.01) |
| *F16B 2/20* | (2006.01) |
| *F16B 9/02* | (2006.01) |
| *F16B 21/07* | (2006.01) |

(52) U.S. Cl.
CPC . *F16B 2/20* (2013.01); *F16B 9/023* (2013.01); *F16B 21/075* (2013.01); *F16L 3/1075* (2013.01); *Y10T 24/1498* (2015.01); *Y10T 24/44274* (2015.01); *Y10T 24/44547* (2015.01)

(58) Field of Classification Search
CPC .......... F16B 2/20; F16B 5/126; F16L 3/1075; Y10T 24/1498; Y10T 24/44274
USPC ................. 24/16 PB, 487; 248/74.3
See application file for complete search history.

(56) References Cited

U.S. PATENT DOCUMENTS

| | | | |
|---|---|---|---|
| 3,944,177 A | 3/1976 | Yoda | |
| 4,291,855 A | 9/1981 | Schenkel et al. | |
| 4,306,820 A | * 12/1981 | Nelson | ............................ 403/13 |
| D273,763 S | 5/1984 | Sakaguchi | |
| 4,478,381 A | 10/1984 | Pittion et al. | |
| 4,591,285 A | * 5/1986 | Nelson | ............................ 403/11 |
| 4,624,432 A | 11/1986 | Salacuse | |
| 4,653,716 A | 3/1987 | Sakaguchi | |
| 4,728,071 A | 3/1988 | Salacuse | |
| 4,802,646 A | 2/1989 | Cattani | |
| D307,541 S | 5/1990 | Tres | |
| 4,955,574 A | 9/1990 | Freier | |
| 5,094,578 A | 3/1992 | Light et al. | |
| 5,118,215 A | 6/1992 | Freier | |

(Continued)

FOREIGN PATENT DOCUMENTS

| | | |
|---|---|---|
| DE | 4031237 A1 | 4/1992 |
| EP | 1422457 A1 | 5/2004 |
| JP | 11002366 A | 1/1999 |

*Primary Examiner* — Robert J Sandy
*Assistant Examiner* — Louis Mercado
(74) *Attorney, Agent, or Firm* — Harness, Dickey & Pierce, P.L.C.

(57) ABSTRACT

A self-closing clip member includes a body having first and second walls. A clamp member is integrally connected to the first wall by a living hinge allowing the clamp member to rotate from an open position into a cavity created between the first and second walls upon direct contact by a tube member, defining a clamp member locked position retaining the tube member. Multiple anti-slide features include a first tab extending from a second wall portion first end. A second tab is oppositely positioned on the second wall. The first and second tabs define cavity end extents. The second tab further extends from a shelf providing a connection between the first wall and an angled intermediate wall. A third tab extends between and is integrally connected to both the intermediate and first walls. The tabs define an anti-slide system preventing the clamp member in the locked position from moving in a direction co-axial to the cavity.

19 Claims, 3 Drawing Sheets

(56) References Cited

U.S. PATENT DOCUMENTS

| | | |
|---|---|---|
| 5,277,387 A | 1/1994 | Lewis et al. |
| 5,535,969 A * | 7/1996 | Duffy, Jr. .................... 248/68.1 |
| 5,772,258 A * | 6/1998 | Dyer et al. .................... 285/114 |
| 5,937,488 A | 8/1999 | Geiger |
| 6,105,216 A | 8/2000 | Opperthauser |
| 6,575,051 B2 | 6/2003 | Lacroix |
| 6,606,786 B2 | 8/2003 | Mangone, Jr. |
| 6,779,241 B2 | 8/2004 | Mangone, Jr. |
| 6,809,257 B2 | 10/2004 | Shibuya |
| 6,935,599 B2 | 8/2005 | van Walraven |
| 6,978,973 B1 | 12/2005 | Gretz |
| 7,140,070 B2 * | 11/2006 | Yuta et al. .................... 16/4 |
| 7,201,352 B2 | 4/2007 | Kawai |
| 7,621,488 B2 | 11/2009 | Miller |
| 7,900,325 B1 | 3/2011 | Mangone, Jr. |
| 8,157,222 B1 * | 4/2012 | Shirey et al. ................. 248/74.1 |
| 2005/0079756 A1 * | 4/2005 | Kawai et al. ................. 439/460 |

* cited by examiner

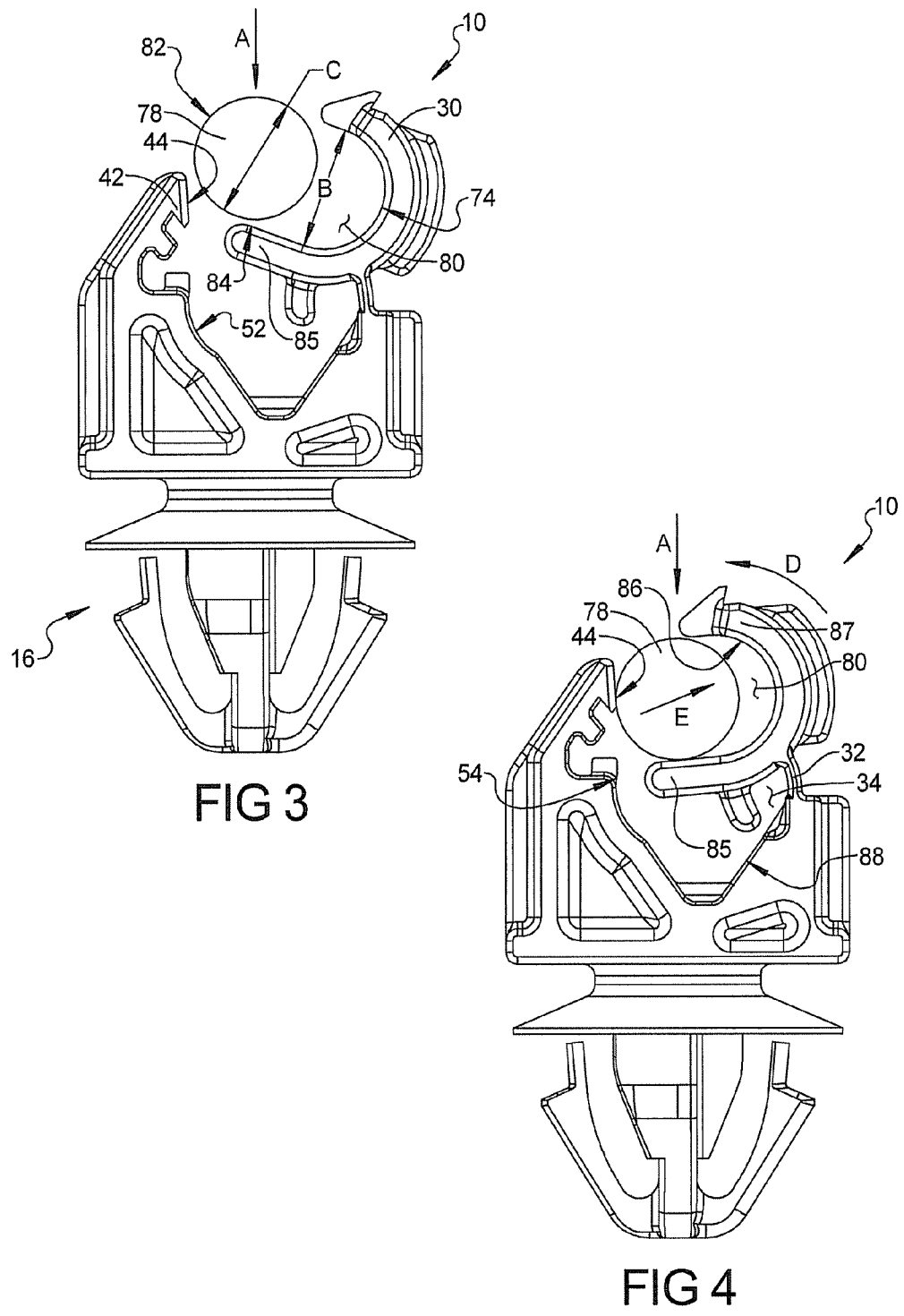

SELF-CLOSING POSITIVE ENGAGEMENT CLIP

FIELD

The present disclosure relates to clips or fasteners used to retain individual tubes, or to create manifolds having multiple tubes for retention to automobile vehicle body panels.

BACKGROUND

This section provides background information related to the present disclosure which is not necessarily prior art.

Fasteners are known that are used to retain one or more tubing items that require a positive lock or retention feature. These fasteners may be used for example for services such as hydraulic brake lines, fuel lines, vacuum lines, or the like. It is known to automatically load multiple tubes such as by a robot into multiple fasteners to create a tubing manifold. Fasteners known to be used for this purpose have either one or more deflectable arms that retain each tube via action oriented coaxial with a longitudinal axis of the arms, which do not positively retain the tube, or have a lock feature that requires a second action to engage the lock feature after the tube member is loaded in the fastener. This is normally done by manually engaging the lock feature. Problems known to arise from this second action are 1) there is an additional time/labor/cost step; and 2) there is no confirmation signal or step that automatically indicates each and every fastener has been properly engaged, thereby creating the potential that some of the fasteners may not be properly engaged.

SUMMARY

This section provides a general summary of the disclosure, and is not a comprehensive disclosure of its full scope or all of its features.

According to several aspects, a self-closing positive engagement clip member includes a body having rigid, opposed first and second walls. A curve-shaped open clamp member is integrally connected to the first wall by a living hinge, allowing the clamp member to rotate from an open position into a cavity created between the first and second walls thereby defining a self-closed and locked position of the clamp member. Multiple anti-slide features, include: a first tab extending from a first end of the second wall portion; a second tab oppositely positioned on the second wall with respect to the first tab, the first and second tabs defining opposed end extents of the cavity; and a third tab. The first, second and third tabs define an anti-slide system acting to prevent the clamp member from moving in a direction co-axial to the cavity when the clamp member is in the locked position.

According to other aspects, a self-closing positive engagement clip member includes a body having rigid, opposed first and second walls. A clamp member is integrally connected to the first wall by a living hinge allowing the clamp member to rotate from an open position into a cavity created between the first and second walls upon direct contact by a tube member thereby defining a self-closed and locked position of the clamp member acting to retain the tube member. Multiple anti-slide features include a first tab extending from a first end of the second wall portion. A second tab is oppositely positioned on the second wall with respect to the first tab. The first and second tabs define opposed end extents of the cavity. The second tab further extends from a shelf providing a connection between the first wall and an angled intermediate wall, with the cavity extending laterally at least between the intermediate wall and the first wall. A third tab extends between and is integrally connected to both the intermediate wall and the first wall. The third tab also extends parallel with the second tab and positioned at a bottom of the cavity. The first, second and third tabs defining an anti-slide system acting to prevent the clamp member from moving in a direction co-axial to the cavity when the clamp member is in the locked position.

According to further aspects, a self-closing positive engagement clip member includes a body having opposed first and second walls separated by a cavity between the first and second walls. A curve-shaped clamp member is integrally connected to the first wall by a living hinge. The living hinge allows contact between a tube and the clamp member to rotate the clamp member from an open position into the cavity thereby defining a self-closed and locked position of the clamp member having the tube member retained by the clamp member. An inner end of the clamp member has an inner face. The inner face of the clamp member contacts a stop wall face of the first wall during rotation of the clamp member such that further displacement of the tube in an installation direction after the clamp member contacts the stop wall acts to elastically deflect the inner end creating a biasing force in the clamp member at the locked position acting opposite to a rotation direction of the clamp member during rotation of the clamp member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a front elevational view of the clip of FIG. 1 during receipt of a tubular item;

FIG. 4 is a front elevational view of the clip of FIG. 3 during automatic closure about the tubular item.

Corresponding reference numerals indicate corresponding parts throughout the several views of the drawings.

DETAILED DESCRIPTION

Example embodiments will now be described more fully with reference to the accompanying drawings.

Figure 1:
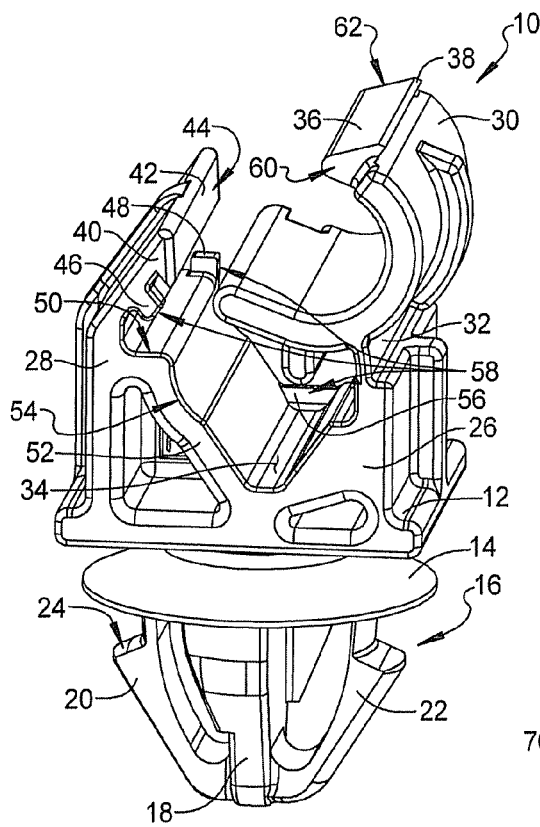
FIG. 1 is a front elevational perspective view of a self-closing positive engagement clip in an open position.

Referring to FIG. 1, a clip member 10 includes a generally rectangular shaped body 12 made for example from an injection molded plastic. A round or oval shaped umbrella 14 can extend from body 12 which acts as a seal after a deflectable leg set 16 is received in an aperture of a body panel of a vehicle, which is shown in greater detail in reference to FIG. 5. Deflectable leg set 16 includes a central post 18 from which oppositely directed first and second deflectable legs 20, 22 extend. Each of the legs 20, 22 includes an engagement face 24 which contacts a face of the body panel after insertion of deflectable leg set 16.

Body 12 also includes rigid, opposed first and second walls 26, 28 that are substantially parallel to each other. A "C" or curve-shaped open ended clamp member 30 is integrally connected to first wall 26 by a living hinge 32 which allows clamp member 30 to rotate from the open or as-molded position shown in FIG. 1 into a cavity 34 created between first and second walls 26, 28 defining a closed position (shown in FIG. 5). Clamp member 30 includes a catch member 36 having a hook shaped end 38. Second wall 28 provides a second wall portion 40 angularly directed toward first wall 26, and has a latching member 42 integrally connected at a free end of second wall portion 40. A flat end face 44 of latching member 42 which is angularly oriented with respect to first and second walls 26, 28 faces clamp member 30.

Figure 5:
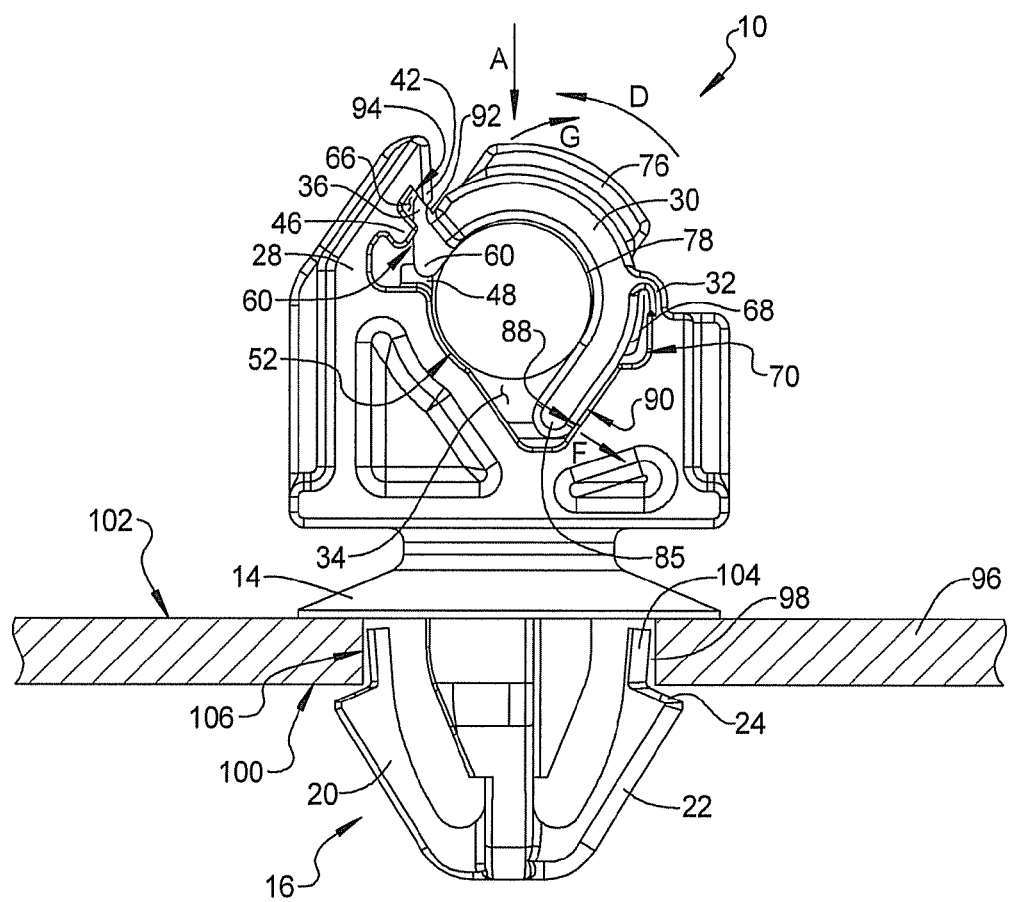
FIG. 5 is a partial cross sectional front elevational view of the clip of FIG. 4 following completion of automatic closure about the tubular item, further having the clip in an installed position in a vehicle body panel.

Several anti-slide features are also provided, including a first tab 46 extending from a first end of second wall portion 40, and a second tab 48 oppositely positioned on second wall 28 with respect to first tab 46, both first and second tabs 46, 48 defining opposed end extents of cavity 34. Second tab 48 further extends from a shelf 50 which provides a connection between second wall 28 and an angled intermediate wall 52. The cavity 34 extends laterally at least between intermediate wall 52 and first wall 26. A tube receiving wall face 54 of intermediate wall 52 is a concave surface facing into cavity 34 and is positioned below and partially aligns with the flat face 44 of latching member 42. A third tab 56 extends between and is integrally connected to both intermediate wall 52 and first wall 26, and extends generally parallel with second tab 48 but is positioned at a bottom of cavity 34. Second tab 48 is positioned at an opposite side of clip member 10 with respect to first tab 46. First, second and third tabs 46, 48, 56 define an anti-slide system 58 which acts to prevent clamp member 30 from moving in a direction co-axial to the cavity 34 and/or a tube installed in the cavity 34 after the clamp member 30 is moved to its locked position shown in FIG. 5. One function of first and second tabs 46, 48 is to directly contact opposed first and second end faces 60, 62 of catch member 36 when clamp member 30 is in the clamp member locked position as shown in FIG. 5.

Referring to FIG. 2 and again to FIG. 1, a tooth member 64 extends from latching member 42 and creates a latching cavity 66 within which catch member 36 is subsequently captured. In the event living hinge 32 fractures during assembly or in subsequent service, a secondary latch feature 68 is provided which integrally extends from clamp member 30 toward cavity 34. Secondary latch feature 68 engages in a similarly shaped slot 70 created in first wall 26 when the clamp member 30 is in the clamp member locked position shown in FIG. 5. Secondary latch feature 68 does not extend across an entire width of clamp member 30, therefore an extending face 72 of first wall 26 functions similar to first, second and third tabs 46, 48, 56 by assisting to capture secondary latch feature 68. Clamp member 30 further includes a curved inner wall 74 that is sized to receive a tube (shown in FIGS. 3-5). To reinforce clip member 10 against deflection, a first stiffening rib 76 is integrally connected to and extends outwardly from clamp member 30, and a second stiffening rib 77 is integrally connected to and extends outwardly from second wall 28.

Figure 2:
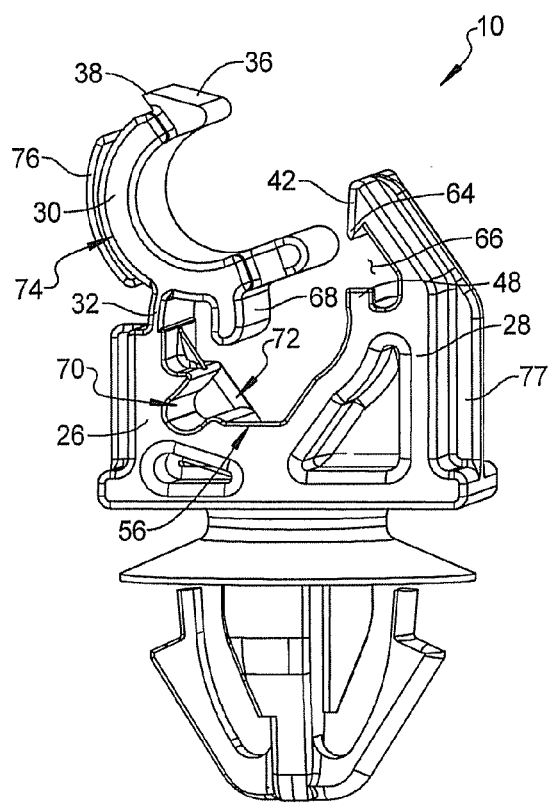
FIG. 2 is a rear elevational perspective view of the self-closing positive engagement clip of FIG. 1.

Referring to FIG. 3 and again to FIGS. 1-2, clip member 10 is again shown in its as-molded and open position. A tube 78 is shown ready for installation into clip member 10 in an automated installation step in a direction "A". A spacing dimension "B" across inner wall 74 is sized to slidably receive a diameter "C" of tube 78 as tube 78 enters a clamp cavity 80 defined by inner wall 74. As tube 78 moves in the installation direction "A", an outer surface 82 of tube 78 will contact and slide across the flat face 44 of latching member 42, and will initially contact an inner wall first portion 84 of an inner end 85 of clamp member 30.

Referring to FIG. 4 and again to FIGS. 1-3, as tube 78 continues to move in installation direction "A", contact with inner end 85 causes the clamp member 30 to rotate in a rotation direction "D" by bending of living hinge 32. During the time tube 78 is in direct contact with flat face 44 of latching member 42, the angular orientation of flat face 44 forces tube 78 to also displace in a direction "E" into the clamp cavity 80 where tube 78 will be retained between inner wall first portion 84 of inner end 85 and an inner wall second portion 86 of an outer end 87 of clamp member 30, and continue displacing into clamp cavity 80 until tube 78 contacts tube receiving wall face 54 of intermediate wall 52. During this time, clamp member 30 continues to rotate in the rotation direction "D" and therefore further into cavity 34, until inner end 85 contacts a stop wall face 88 of first wall 26.

Referring to FIG. 5, and again to FIGS. 1-4, the clamp member locked position is shown. To reach the locked position, tube 78 is displaced in the installation direction "A" until the catch member 36 contacts and then is frictionally forced past latching member 42 to automatically latch clip member 10. Some elastic outward deflection of second wall 28 and some inward elastic deflection of catch member 36 can occur during this travel portion. As this occurs, the secondary latch feature 68 engages in slot 70 created in first wall 26. In addition, to reach the locked position, after a face 90 of inner end 85 of clamp member 30 contacts the stop wall face 88 of first wall 26, further displacement of tube 78 in the installation direction "A" elastically deflects inner end 85 creating a biasing force "F" in clamp member 30 which acts in the direction indicated for biasing force "F" to rotate clamp member 30 in a direction "G" substantially opposite to rotation direction "D". The biasing force "F" acts to retain a catch member face 92 of the catch member 36 in direct contact with a latching member face 94 of the latching member 42.

In the clamp member locked position, tube 78 is captured between inner end 85, outer end 87, and inner wall 74 of clamp member 30, and is held in direct contact against intermediate wall 52. Also in the clamp member locked position, a portion of first tab 46 extends beyond and thereby captures first face 60, the second tab 48 captures the second face 62 of catch member 36 as previously described, and third tab 56 partially closes the cavity 34 preventing axial displacement of tube 78 and/or clamp member 30. The capture function provided by the first, second and third tabs 46, 48, 56 prevents an axial force imparting axial motion of tube 78 (toward or away from the viewer as shown in FIG. 5) that can occur during vehicle operation, heat-up, or cool-down from unlatching clamp member 30 of clip member 10.

With continued reference to FIG. 5, clip member 10 is shown in an installed position with respect to a panel 96 such as a vehicle body panel of an automobile vehicle. The central post 18 extends through an aperture 98 of panel 96 such that the engagement faces 24 of each of the first and second deflectable legs 20, 22 face and can contact a lower surface 100 of panel 96 preventing pull-out of clip member 10, while umbrella 14 contacts an upper surface 102 of panel 96 thereby sealing the area proximate to aperture 98. A freely extending portion 104 of each of the first and second deflectable legs 20, 22 can contact opposed portions of an inner wall 106 defined by aperture 98 to self-align clamp member 10 within aperture 98.

The present disclosure concerns an injection molded plastic material clip that is pressed into an aperture of a vehicle body panel in an area where the clip can be used to retain a tubing item that requires a positive lock or retention feature, for example for services such as hydraulic brake lines, fuel lines, vacuum lines, or the like. The clip member 10 of the present disclosure replaces known fastener designs used for this purpose and provides multiple advantages, including a positive lock feature that automatically locks during installation of the tube. In addition, clip member 10 provides multiple anti-slide features that prevent axial motion of the tube from causing axial displacement of the tube from causing disconnection of the clip. The angularly oriented geometry provided by the flat face 44 of latching member 42 together with the inner end 85 of clamp member 30 forces the clamp member 30 to automatically rotate toward a latched position when contacted by a tube by clamp member rotation with respect to a living hinge. The geometry provided by the flat face 44 of latching member 42 also automatically forces the tube further into the clamp member cavity 80 as the clamp member rotates. The clip member is a one-piece, injection molded plastic fastener that also integrally includes the first, second and third tab features of the anti-slide system 58 described in reference to FIGS. 1 and 5 that prevent the clamp member from being axially dislodged if an axial force is applied to the tube after installation.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A self-closing positive engagement clip member, comprising:
   a body having rigid, opposed first and second walls;
   a curve-shaped open clamp member integrally connected to the first wall by a living hinge allowing the clamp member to rotate from an open position into a cavity created between the first and second walls thereby defining a self-closed and locked position of the clamp member; and
   multiple anti-slide features, including a first tab extending from a first end of the second wall, a second tab oppositely positioned on the second wall with respect to the first tab, the first and second tabs defining longitudinally opposed end extents of the cavity, and a third tab, the first, second and third tabs defining an anti-slide system acting to prevent the clamp member from moving in a direction co-axial to the cavity when the clamp member is in the locked position;
   wherein the first and second tabs are positioned to capture first and second longitudinally opposed ends of the clamp member, respectively;

wherein the clamp member further includes:
a primary latch feature including a catch member having a hook shaped end acting to engage the second wall in the locked position; and
a secondary latch feature integrally extending from the clamp member toward the cavity, the secondary latch feature engaging in a complimentary shaped slot created in the first wall when the clamp member is in the clamp member locked position.

2. The self-closing positive engagement clip member of claim 1, wherein the second tab further extends from a shelf providing a connection between the second wall and an angled intermediate wall, the cavity extending laterally at least between the intermediate wall and the first wall.

3. The self-closing positive engagement clip member of claim 2, further including a tube receiving wall face of the intermediate wall defining a concave surface facing into the cavity and positioned below and partially aligned with a flat face of a latching member.

4. The self-closing positive engagement clip member of claim 2, wherein the third tab extends between and is integrally connected to both the intermediate wall and the first wall, extends generally parallel with the second tab, and is positioned at a bottom of the cavity.

5. The self-closing positive engagement clip member of claim 1, wherein the secondary latch feature extends across less than an entire width of the clamp member, such that an extending face of the first wall acts to capture the secondary latch feature in the clamp member locked position.

6. The self-closing positive engagement clip member of claim 1, wherein the second tab is positioned at an opposite side of the clip member with respect to the first tab.

7. The self-closing positive engagement clip member of claim 1, wherein the first and second tabs directly contact opposed first and second end faces of the catch member when the clamp member is in the clamp member locked position.

8. The self-closing positive engagement clip member of claim 1, wherein the second wall includes: a second wall portion angularly directed toward the first wall; a latching member integrally connected at a free end of the second wall portion; and a flat end face of the latching member being angularly oriented with respect to the first and second walls and facing the clamp member.

9. A self-closing positive engagement clip member, comprising:
a body having rigid, opposed first and second walls;
a clamp member integrally connected to the first wall by a living hinge allowing the clamp member to rotate from an open position into a cavity created between the first and second walls upon direct contact by a tube member thereby defining a self-closed and locked position of the clamp member acting to retain the tube member; and
multiple anti-slide features, including:
a first tab extending from a first end of the second wall portion;
a second tab oppositely positioned on the second wall with respect to the first tab, the first and second tabs defining opposed end extents of the cavity, the second tab further extending from a shelf providing a connection between the second wall and an angled intermediate wall, the cavity extending laterally at least between the intermediate wall and the first wall; and
a third tab extending between and integrally connected to both the intermediate wall and the first wall, the third tab also extending parallel with the second tab and positioned at a bottom of the cavity;
the first, second and third tabs defining an anti-slide system acting to prevent the clamp member from moving in a direction co-axial to the cavity when the clamp member is in the locked position.

10. The self-closing positive engagement clip member of claim 9, further including:
a second wall portion of the second wall angularly directed toward the first wall; and
a latching member integrally connected at a free end of the second wall portion.

11. The self-closing positive engagement clip member of claim 10, further including a flat end face of the latching member angularly oriented with respect to the first and second walls, having the flat end face facing the clamp member.

12. The self-closing positive engagement clip member of claim 11, further including:
an inner end of the clamp member having an inner face;
wherein as the tube moves in an installation direction into the clamp member, an outer surface of the tube contacts and slides across the flat end face of the latching member, and contacts the inner face of the inner end of the clamp member.

13. The self-closing positive engagement clip member of claim 11, wherein to reach the locked position, the tube is displaced in an installation direction until a catch member contacts and is frictionally forced past the latching member thereby automatically latching the clip member.

14. The self-closing positive engagement clip member of claim 9, further including:
an inner end of the clamp member having an inner face;
a face of the inner end of the clamp member when in contact with a stop wall face of the first wall occurring at the locked position, wherein further displacement of the tube in an installation direction acts to elastically deflect the inner end creating a biasing force in the clamp member acting opposite to a rotation direction of the clamp member during clamp closing.

15. The self-closing positive engagement clip member of claim 14, further including:
a catch member face of a catch member; and
a latching member face of a latching member aligned in parallel and positioned in direct contact with the catch member face in the locked position, wherein the biasing force acts to retain the catch member face in direct contact with the latching member face.

16. A self-closing positive engagement clip member, comprising:
a body having opposed first and second walls separated by a cavity between the first and second walls;
a curve-shaped clamp member integrally connected to the first wall by a living hinge, the living hinge allowing contact between a tube member and the clamp member to rotate the clamp member from an open position into the cavity thereby defining a self-closed and locked position of the clamp member having the tube member retained by the clamp member;
cooperating self-locking features associated with upper portions of the first wall and the curved-shaped clamp member, respectively, wherein the cooperating self-locking features engage each other to couple the upper portions of the first wall and the curved-shaped clamp member together in the self-closed and locked position of the clamp member;
an inner end of the clamp member having a distal end portion extending beyond a vertical plane passing through a center of the cavity when the clamp member is in the self-closed and locked position, wherein the center of the cavity extends through a center of the tube member when the tube member is retained by the curve-shaped clamp member in the self-closed and locked position; and an angled intermediate wall surface extending downwardly from an upper portion of the angled intermediate wall surface that is adjacent the second wall and toward a lower central portion of the cavity;

wherein the angled intermediate wall and the extending distal end of the clamp member are positioned to engage the tube during insertion and cause a force directed through the tube to both rotate the clamp member and interlock the cooperating self-locking features.

17. The self-closing positive engagement clip member of claim 16, further including multiple anti-slide features, including a first tab extending from a first end of the second wall.

18. The self-closing positive engagement clip member of claim 17, wherein the multiple anti-slide features further include a second tab oppositely positioned on the second wall with respect to the first tab, the first and second tabs defining opposed end extents of the cavity.

19. The self-closing positive engagement clip member of claim 18, wherein the multiple anti-slide features further include a third tab, the first, second and third tabs defining an anti-slide system acting to prevent the clamp member from moving in a direction co-axial to the cavity when the clamp member is in the locked position.

* * * * *